United States Patent
Rüthlein et al.

(10) Patent No.: US 6,584,001 B2
(45) Date of Patent: Jun. 24, 2003

(54) POWER CONVERTER MODULE

(75) Inventors: Alfred Rüthlein, Sennfeld (DE); Dominique Lafore, Marseilles (FR); Jacques Legeleux, Marseilles (FR)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/993,124

(22) Filed: Nov. 5, 2001

(65) Prior Publication Data

US 2002/0057587 A1 May 16, 2002

(30) Foreign Application Priority Data

Nov. 3, 2000 (DE) ........................................ 100 54 489

(51) Int. Cl.$^7$ ................................................ H02M 1/00
(52) U.S. Cl. .................. 363/144; 363/132; 363/147; 257/691; 257/724; 307/147; 307/150; 327/565; 361/730
(58) Field of Search ................................ 363/132, 144, 363/147; 257/723, 724, 690, 691–693; 307/131, 147, 150, 10.1, 10.6; 327/564, 565, 566; 361/781, 783, 778, 728–730, 820

(56) References Cited

U.S. PATENT DOCUMENTS

| | | | | |
|---|---|---|---|---|
| 5,055,990 A | * | 10/1991 | Miki et al. | 363/56.05 |
| 5,172,310 A | * | 12/1992 | Deam et al. | 307/148 |
| 5,623,399 A | * | 4/1997 | Ishii et al. | 363/132 |
| 6,212,087 B1 | * | 4/2001 | Grant et al. | 363/144 |

\* cited by examiner

*Primary Examiner*—Michael Sherry
*Assistant Examiner*—Gary L. Laxton
(74) *Attorney, Agent, or Firm*—Cohen, Pontani, Lieberman & Pavane

(57) ABSTRACT

In a power converter module, a first input area intended to be connected to a first predetermined electric potential (+V) or a second input area intended to be connected to a second predetermined electric potential (−V) can be connected to an output area. At least one group of switches is provided, each group of switches has two semiconductor switch units, and each of the semiconductor switch units has a gate terminal. An input terminal of one of the semiconductor switch units is connected to the first input area, and an input terminal of the other semiconductor switch unit is connected to the second input area. Each of the semiconductor switch units has an output terminal, which is connected to the output area. The two semiconductor switch units of the minimum of one group of switches are positioned facing each other in such a way that at least the output terminals are opposite each other.

22 Claims, 4 Drawing Sheets

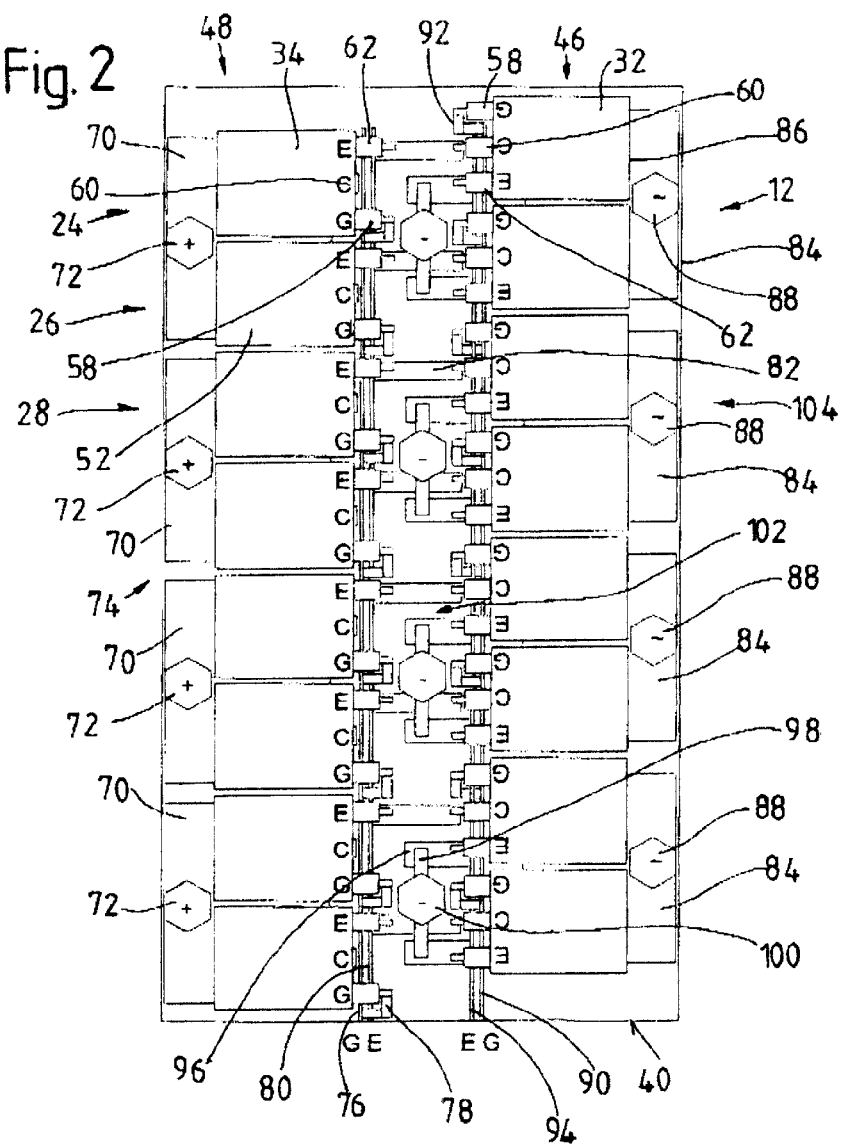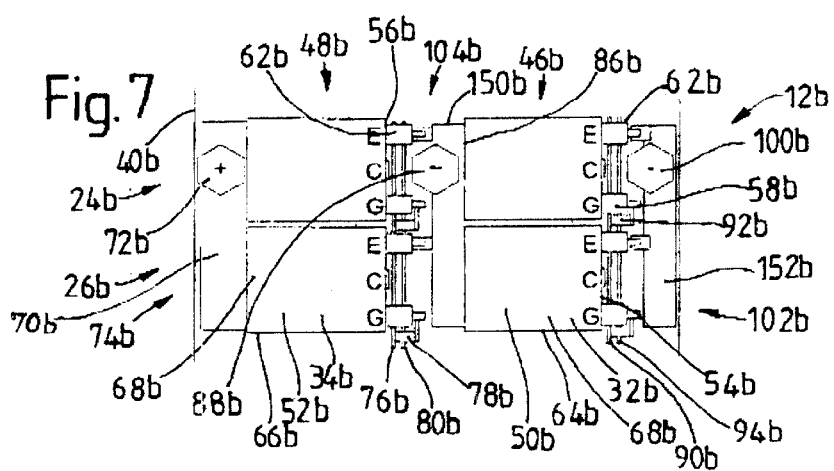

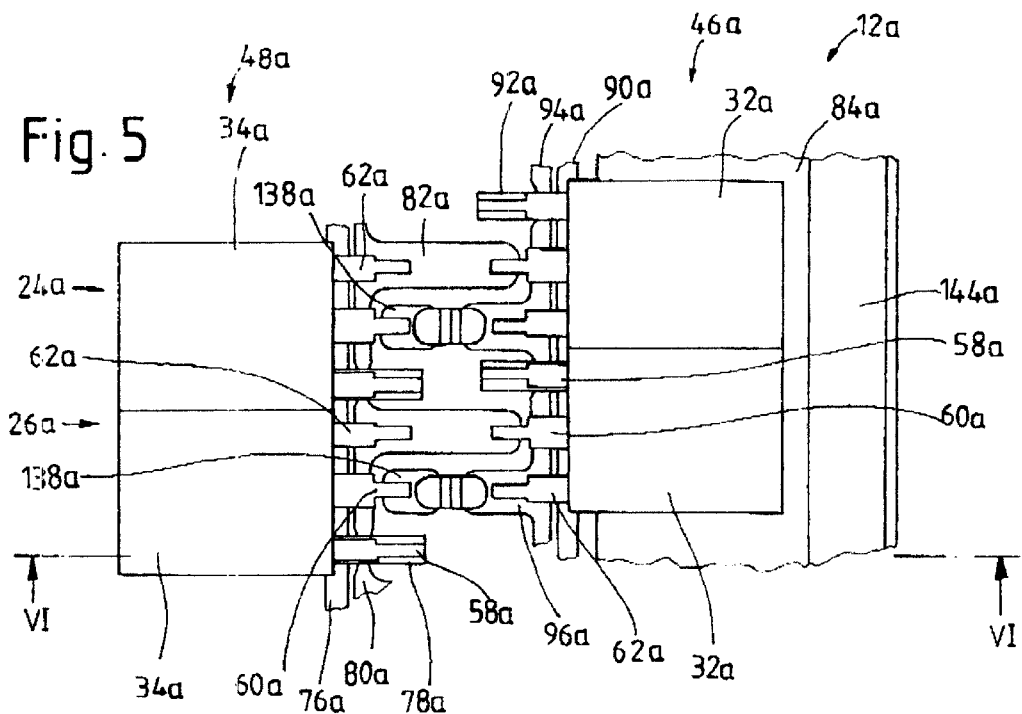
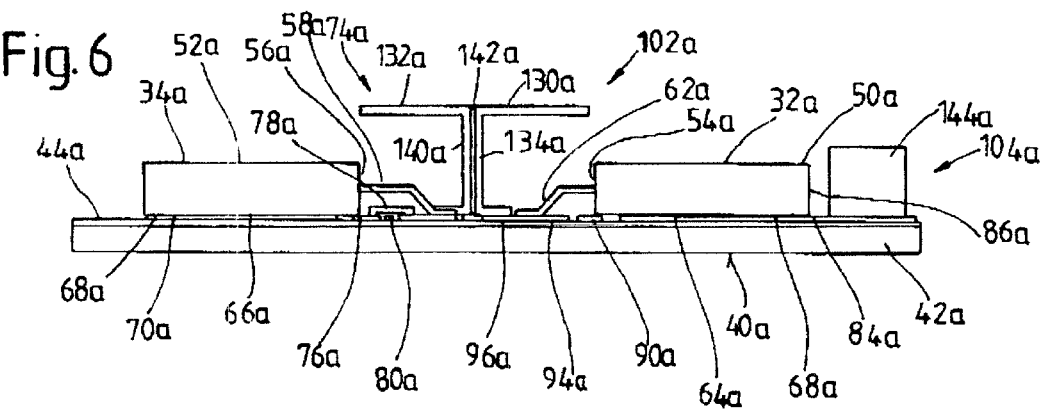

POWER CONVERTER MODULE

BACKGROUND OF THE INVENTION

1. Field of the Invention

The present invention pertains to a power converter module in which optionally either a first input area designed to be connected to a first, predetermined electric potential or a second input area intended to be connected to a second predetermined electric potential can be electrically connected to an output area. The module includes at least one group of switches, where the minimum of one group of switches has two semiconductor switch units, each of which has a gate terminal. An input terminal of one of the semiconductor switch units is connected to the first input area and an input terminal of the other semiconductor switch unit is connected to the second input area, and each of the semiconductor switch units has an output terminal connected to the output area.

2. Description of the Related Art

These types of power converter modules are used, for example, in the devices called converters, which serve to excite multiphase electric motors such as those of the synchronous or asynchronous type. A schematic circuit diagram of a converter of this type for a three-phase electric motor is shown in FIG. 1. It can be seen that the converter 10 shown there has three converter modules 12, 14, 16. Each of the three motor phases 18, 20, 22 is excited by one of the converter modules 12, 14, 16. Because the three modules 12, 14, 16 are identical to each other in principle, the basic design of the modules will be described below with reference to the converter module 12.

The converter module 12 has, for example, four groups 24, 26, 28, 30 of semiconductor switch units 32, 34, these groups being connected in parallel to each other. Each of the semiconductor switch units shown in the example consists of an IGBT (insulated gate bipolar transistor), serving as a so-called power switch element. Each of these IGBTs has a gate G, serving as the gate terminal, and emitter and collector terminals, which are to be connected to each other. The collector terminal of the IGBT 32 is connected conductively to the emitter terminal of the IGBT 34. These two terminals C and E of the IGBTs 32 and 34 form the output terminals connected to the associated phase 18. The emitter terminal E of the IGBT 32 forms the input terminal of its transistor and is connected conductively to the input side 36, which is at the potential −V. In a corresponding manner, the collector terminal C of the IGBT 34 forms the input terminal of its transistor and is connected conductively to the input side 38, which is at the potential +V. Depending on whether the potential +V or −V is to be applied to the phase 18, one of the IGBTs 32 or 34 of the associated groups of switches 24, 26, 28, 30 will be switched to the conducting state, while the other remains nonconducting. In this way, it is possible to reverse the polarity of the various motor phases as required. Several IGBTs must be connected in parallel especially because, in the case of powerful electric motors, the currents flowing through the system during operation are very high, reaching as much as 400 A, for example. The individual power switch elements such as IGBTs or even MOSFETs, however, are usually suitable for currents of up to only 50 A. By connecting several of these power semiconductor switch elements in parallel, therefore, it is possible to adapt the power conversion in a stepwise manner to the requirements of the concrete application.

Adapting the individual modules of a converter of this type to the prevailing requirements usually calls for the development of special circuits. This process includes the production of the appropriate printed-circuit boards, the substrates of which are usually made of ceramic, and the insertion of the various power transistors, these circuits being designed with the goal of minimizing the inductances and maximizing the thermal tie-in to the existing cooling systems. It is very expensive to develop modules of this type, but even with the use of very expensive materials such as the ceramic substrates and expensive fabrication techniques for inserting the individual power transistors, the end result is still an assembly which is susceptible to damage from the loads which occur during actual operation. Especially the alternating thermal loads associated with the switching processes can lead to fractures, a susceptibility which is also promoted by the vibrations which occur when such units are used in motor vehicles, for example. As a result of the internal inductances which are present, the problem of so-called over-voltage transients also occurs frequently when current is switched from one transistor to another.

SUMMARY OF THE INVENTION

It is the object of the present invention to provide a power converter module which can be produced at favorable cost and which offers improved operating characteristics at the same time.

According to the invention, the two semiconductor switch units of the minimum of one group of switches are positioned facing each other in such a way that at least the output terminals thereof are opposite each other.

Because the arrangement according to the invention is designed so that the distance between two semiconductor switch units is as short as possible, especially with respect to the current pathway extending from the first to the second input area, it is ensured that the inductances of these groups of switches, which can be referred to as half-bridges, are low. Orienting the individual units of a group of switches so that they are facing each other, furthermore, also makes it possible to "stack" several of these groups easily on top of each other, with the result that it becomes comparatively simple to design the substrate during the development process, and at the same time the overall arrangement becomes highly compact.

It is possible, for example, for each of the semiconductor switch units of the power converter module according to the invention to have a switch housing, for the connecting sides of the switch housings to be arranged facing each other, at least the output terminals being provided on these connecting sides of the housings, and for the switch housings of the two semiconductor switch units to be offset with respect to each other in a housing offset direction in such a way that the two output terminals face each other essentially without any offset in the housing offset direction.

The use of switch housings for the individual semiconductor switch units has the result that the essential switching elements of the units are protected within the housing and thus more effectively shielded from external influences, especially mechanical influences.

In a preferred embodiment of the present invention, it is possible to provide the gate terminal, a first contact area of a first contact terminal, and a second contact terminal on the connecting side of the housing of each semiconductor switch unit and also to situate the second contact terminal of one of the semiconductor switch units, i.e., the terminal serving as the unit's output terminal, opposite, and thus in electrical contact with, the first contact area of the first contact terminal of the other semiconductor switch unit, i.e., the area serving as at least part of its output terminal.

So that it is possible to make the most efficient possible use of the space which is available or required in the power converter module according to the invention, it is proposed that a second contact area of the first contact terminal be provided on the switch housing of the semiconductor switch unit, which second contact area is connected conductively to the first contact area; that the second contact area of the one semiconductor switch unit, i.e., the area serving as its input terminal, be connected conductively to the first input area; and that the second contact area of the other semiconductor switch unit, i.e., the area serving as part of its output terminal, be connected conductively to the output area.

In an alternative design of the power converter module according to the invention, it can also be provided that the first contact area of the one semiconductor switch unit, i.e., the area serving as its input terminal, is connected conductively to the first input area. Here, too, it is possible for a second contact area of the first contact terminal to be provided on the switch housing of the semiconductor unit, which second contact area is connected conductively to the first contact area, and for the second contact area of the other semiconductor switch unit, i.e., the area serving as part of its output terminal, to be connected conductively to the output area.

In a design of this type, it is also preferable for the second contact terminal of the other semiconductor switch unit, i.e., the terminal serving as its input terminal, to be connected to the second input area.

According to another aspect of the present invention, each of the semiconductor switch units has a switch housing, where the gate terminal, optionally a first contact area of a first contact terminal, and a second contact terminal are provided on the connecting side of the housing of each semiconductor switch unit, and the semiconductor switch units of the minimum of one group of switches are positioned so that the connecting side of the housing of one of the semiconductor switch units faces the rear of the housing (i.e., the side opposite the connecting side) of the other semiconductor switch unit. This arrangement also results in the closest possible packing of the individual semiconductor switch units, which is especially advantageous in cases where a large number of groups of switches is present in a single module.

So that the units can be packed as closely together as possible, it is also advantageous for the semiconductor switch units of the minimum of one group of switches to face each other essentially without any offset.

So that the necessary conductive pathways or traces on the substrate can also be kept as short as possible in this embodiment for the purpose of avoiding inductance problems as completely as possible, a second contact area of the first contact terminal can be provided on the switch housing of the semiconductor switch unit, which second contact area is connected conductively to the first contact area. The second contact terminal of one of the semiconductor switch units, i.e., the terminal serving as its output terminal, can be connected conductively to the second contact area of the first contact terminal of the other semiconductor switch unit, i.e., the area serving as its output terminal. It is possible, for example, for the second contact area to be provided on the bottom of each of the switch housings in question.

As already discussed above, it is necessary especially in the case of powerful electric machines to design the converter modules to carry comparatively high currents in the range of several 100 A. It is therefore proposed that a plurality of groups of switches be provided and that the semiconductor switch units of one of the groups of switches be arranged in a first row and that the semiconductor switch units of the other group of switches be arranged in a second row. The arrangement of these semiconductor switch units in rows on the substrate guarantees the closest possible packing and also makes it comparatively easy to lay out the conductive pathways to be provided on the substrate for the various input and output areas.

So that the individual input and output terminals can be brought easily into contact with the various potentials or phase connections, it is proposed that all the input terminals of one set of semiconductor switch units be connected or connectable to a conductor system of the first input area, that all the input terminals of the other set of semiconductor switch units be connected or connectable to a conductor system of the second input area, and that all the output terminals of the semiconductor switch units be connected or connectable to a conductor system of the output area.

It is possible here, for example, for the conductor system of the first input area and/or the conductor system of the second input area and/or the conductor system of the output area to comprise a conductor rail extending along the rows of semiconductor switch units. In another embodiment, contact with the various potentials can also be established alternatively or additionally by designing the conductor system of the first input area and the conductor system of the second input area in the form of conductor plates, which extend essentially parallel to each other and which are or can be situated above the rows of semiconductor switch units. This arrangement is especially preferred, because it also makes it possible to connect several adjacent modules to the various potentials with the same plates.

So that the inductances can also be minimized in these areas of contact with the potentials, it is proposed that at least certain parts of the conductor rails or conductor plates assigned to the first and second input areas rest against each other across a layer of insulating material.

In the power converter module according to the invention, furthermore, it is also possible for all of the gate terminals of one set of semiconductor switch units to be connected to a gate line of the first row of semiconductor switch units preferably by way of resistors, and for all of the gate terminals of the other set of semiconductor switch units also to be connected to a gate line of the second row of semiconductor switch units preferably by way of resistors.

So that heat can be carried away from the area of the individual power switches as efficiently as possible with the lowest-cost design, it is proposed that the minimum of one group of switches be mounted on an insulated metal substrate.

As already explained, each of the individual semiconductor switch units can comprise at least one IGBT semiconductor switch element (insulated gate bipolar transistor) or at least one MOSFET semiconductor switch element (metal oxide semiconductor field-effect transistor).

So that the above-mentioned mechanical loads exerted on these types of semiconductor switch elements can be minimized, it is proposed that the minimum of one semiconductor switch element be embedded in the switch housing.

The present invention also pertains to a power converter device for a multiphase electric machine, in which a power converter module according to the invention is assigned to each phase of the electric machine.

As already discussed, it is possible in this type of design of a converter device for all of the input terminals of the one set of semiconductor switch units to be connected or connectable to the conductor plate of the first input area and for all the input terminals of the other set of semiconductor switch units to be connected or connectable to the conductor plate of the second input area.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 is a plan view of a converter module according to the invention

FIG. 5 is a partial plan view of a converter module according to the invention representing an alternative design embodiment;

FIG. 6 is a sectional view of the converter module illustrated in FIG. 5 along line VI—VI in FIG. 5; and FIG. 7 is a partial plan view of another embodiment of a converter module according to the invention.

DETAILED DESCRIPTION OF THE PRESENTLY PREFERRED EMBODIMENTS

Figure 3:
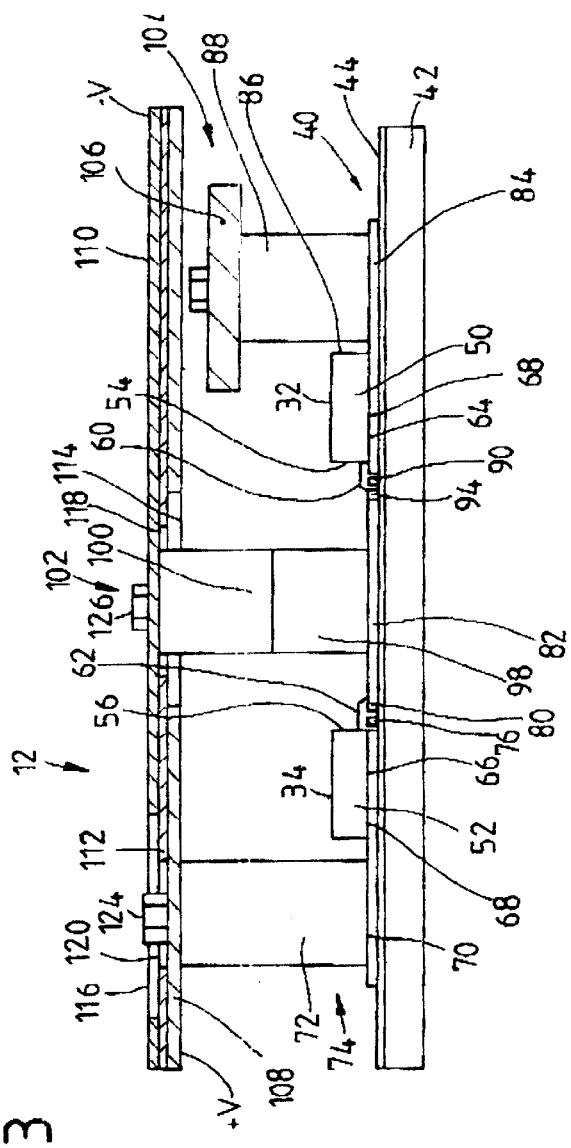
FIG. 3 is a sectional view of the converter module shown in FIG. 2.
Figure 4:
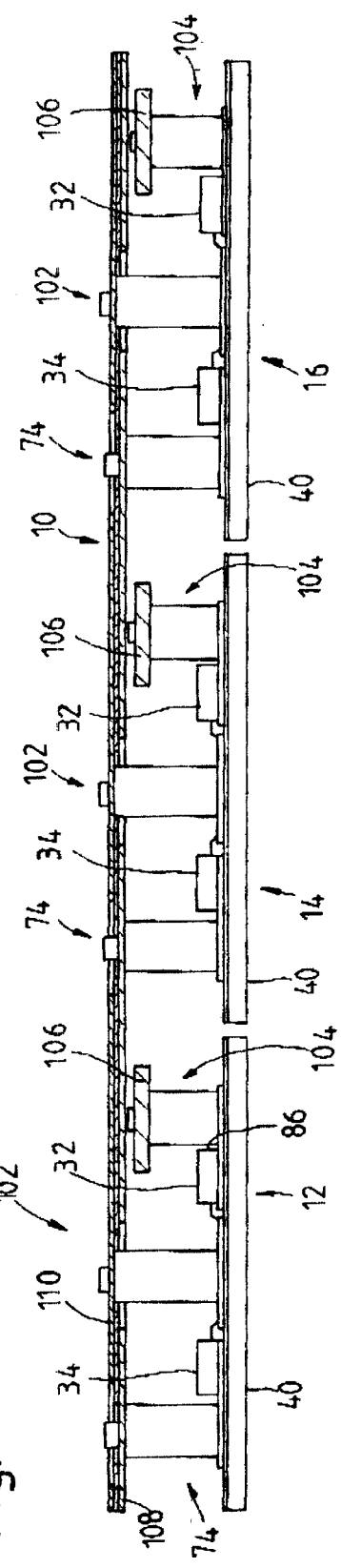
FIG. 4 is a sectional view similar to that of FIG. 3 of a converter comprising three converter modules according to the invention.

A first embodiment of a power converter module according to the invention is illustrated in FIGS. 2–4. It should be pointed out that this power converter module follows the principles illustrated in FIG. 1 with respect to the circuitry involved and thus has a plurality of groups of switches or half-bridges, to be described below, each of which is formed out of two power semiconductor switch units. In the examples illustrated, therefore, reference is made only to a single power converter module of this type, although, as can be seen in FIG. 4, several of these types of modules are assigned to a multiphase motor such as a synchronous or an asynchronous motor, the number of modules corresponding to the number of phases. It should also be pointed out that, in the examples illustrated, IGBTs are shown as examples of power semiconductor switch elements. It is obvious that other types of semiconductor power switch elements such as MOSFETs could also be used here.

In the exemplary embodiment shown in FIGS. 2–4, the power converter module 12 has an insulated metal substrate (IMS) 40 as carrier. This comprises a support plate 42 of metal such as aluminum, on which a layer 44 of insulation, such as a sheet of plastic, is provided. Several conductive pathways or contact surfaces, which are used to establish electrical connections between various areas and components, are then provided on this layer of insulation 44.

As can be seen in FIG. 2, eight groups of switches are provided on the insulated metal substrate 40. Only the top three of these are designated by reference numbers, namely, 24, 26, 28. Each of these groups of switches 24, 26, 28, etc., comprises in turn two semiconductor switch units, so that ultimately each pair of semiconductor switch units 32, 34 forms a half-bridge. The individual groups of switches 24, 26, 28, etc., that is, the individual pairs of semiconductor switch units 32, 34, are arranged with respect to each other in such a way that two rows 46, 48 of semiconductor switch units are obtained, the individual semiconductor switch units being mounted close together and oriented in essentially the same direction in each row.

Figure 1:
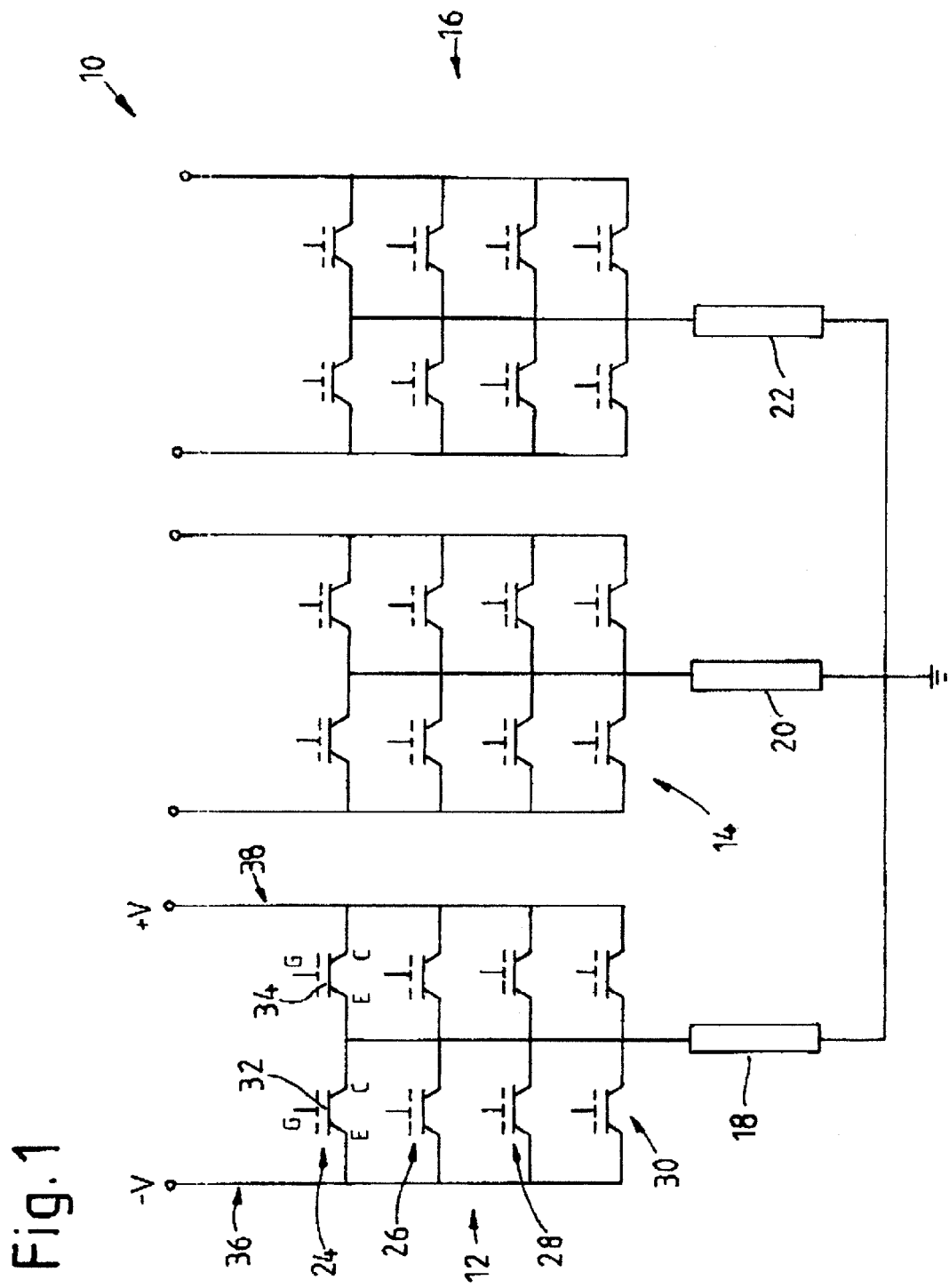
FIG. 1 is a schematic diagram of the circuitry of a converter with three converter modules used for a three-phase electric motor.

Each of the first and second semiconductor switch units 32, 34 has a switch housing 50, 52, which can also be seen in FIG. 3. These can be standard housings, which are easy to handle under conditions of industrial fabrication. The actual switch elements themselves, the circuitry of which is illustrated in FIG. 1, are then inserted and embedded in the switch housings 50, 52, which are usually made of plastic, so that they are supported firmly and stably and thus are less susceptible to the negative effects of vibrations. The three terminals of the semiconductor switch units or IGBTs are connected in an electrically conductive manner in the individual switch housings 50, 52 to terminals provided on the housings. These thin connecting lines can also be embedded in material inside the switch housings 50, 52 and thus also protected to some extent from environmental influences and also from the effects of vibrations.

Each of the switch housings 50, 52 has a contacting side 54, 56, on which three connection lugs 58, 60, 62 are provided. The connection lug 58 serves as the gate terminal. The connection lug 60 is a first contact area of the collector, and the connection lug 62 forms a first contact terminal by which the emitter of the IGBT installed in the switch housing 50, 52 can be contacted. A second contact area 68, positioned facing the substrate 40, is provided on the bottom 64, 66 of the associated switch housing 50, 52, this second contact area being electrically connected directly to the connection lug 60, so that ultimately the connection lug 60 and the contact area 68 on the bottom 64, 66 form together a first contact terminal for the collector of the semiconductor switch element in question.

In the row 48 of semiconductor switch units 34, the collector terminals C, that is, the contact terminals formed by the contact areas 68 and 60, form the input terminals for the semiconductor switch units 34. So that the collector of the IGBT provided in each switch housing 52 can be brought into contact with the intended potential +V, several contact surfaces 70 of conductive material are formed on the substrate 40. The contact surfaces 70 are large enough that each one can accept two switch housings 52 immediately adjacent to each other in the direction in which the row 48 extends, so that, by soldering the contact areas 68 of these two switch housings 52 to the contact surfaces 70, a connection is established between the switch housings 52 and the substrate 40, i.e., between the housings and the contact surfaces 70 provided on the substrate, which connection is both electrically conductive and also mechanically strong. An upward-projecting conductor pin 72 is attached to each of the contact surfaces 70, by means of which, as will be described below, the electrical connection to a potential is established. These contact surfaces 70 with their assigned pins 72 therefore form a part of a first input area 74, namely, the input area 74 to which the input terminals of the row 48 of semiconductor switch units 34, i.e., their contact areas 68, are connected in an electrically conductive manner.

A gate line 76, which extends in front of the connecting side of the housing of the semiconductor switch unit 34, can also be seen on the substrate 40. The lug 58, that is, the gate of the individual semiconductor switch unit 34, is connected conductively to this gate line 76 by way of a decoupling resistor 78. In addition, a reference line 80 is also provided, which parallels the gate line 76 on the substrate 40 and which is connected electrically to the associated lugs 62 of the semiconductor switch units 34, that is, to the emitter terminals. This reference line 80 forms a reference potential for the gate line 76, so that the gate voltage, which is applied to the gate terminals G of the IGBTs, i.e., to the lugs 58, to switch them to the conductive state, has, as a reference potential, the potential of the emitter terminals, that is, of the lugs 62 and of the line 80.

The connection lugs or contact terminals 62, that is, the emitter terminals of the individual IGBTs, simultaneously form the output terminals of the associated semiconductor switch units 34 of the row 48. Each of these contact terminals, that is, each lug 62, is connected conductively to a contact surface 82 on the substrate 40, which surface, in its longitudinal direction, extends away from the associated connecting side 56 of the housing of the semiconductor switch unit 34 essentially in a straight line toward the row 46 of semiconductor switch units 32. It can be seen in FIG. 2 that the lugs 60, that is, the collector terminals of the semiconductor switch units 32, are connected conductively to these contact surfaces 82. In particular, the positioning of the two semiconductor switch units 32, 34 of each group of switches 24, 26, 28, etc., is such that the lugs 62, that is, the emitter terminals of the semiconductor switch units 34, are directly opposite the lugs 60, that is, the collector terminals or collector terminal areas, of the semiconductor switch units 32 without any offset in the direction of the individual rows 46, 48. Thus the shortest possible conductive connection is established between these two lugs 60, 62, which form the output terminals of the semiconductor switch units 32, 34, and offer the advantage of the lowest possible inductance in this area. The lug 60 of the semiconductor switch unit 32 is, as already described above, connected conductively to the contact area 68 provided on the bottom 64 of the switch housing 50 and forms ultimately together with it the output terminal of the semiconductor switch unit 32. Contact surfaces 84 are also provided for these units on the substrate 40, which surfaces are again of such a size that two semiconductor switch units 32 can fit on one contact surface 84. The contact areas 68 of the switch units can be permanently attached to these areas by soldering. Conductor pins 88 are again provided on the parts of the contacting surfaces 84 which project out beyond the backs 86 of the associated semiconductor switch units 32; as will be described below, these pins are used to establish the electrical connection to the associated phase of the driven electric machine.

A gate line 90 on the substrate 40 is also assigned to the gate terminals, that is, to the lugs 58, of the semiconductor switch units 32, which line extends along the connecting sides 54 of the housings of the semiconductor switch units 32 and is connected conductively in turn to the lugs 58 via decoupling resistors 92. Again, the reference line 94, by which the contact terminals, that is, the lugs 62, are connected conductively, extends alongside the gate line 90 in order to create a reference potential for the activation of the IGBTs provided in the housings 50. The lugs 58, furthermore, which ultimately form the input terminals of the semiconductor switch units 32, are connected conductively to associated contact surfaces 96. Conductor pins 100 are connected to these contact surfaces 96 by the bridges 98, which pass across the associated contact surfaces 82. These pins, as will be described again below, establish the electrically conductive connection to the potential −V. These contact surfaces 96 with the bridges 98 and the conductor pins 100 therefore ultimately form a second input area or part of a second input area designated 102 overall. In a corresponding manner, the contact surfaces 84 and the conductor pins 88 form at least part of an output area 104 of the associated module 12.

Through the offset arrangement of the semiconductor switch units 32, 34 of the individual groups of switches 24, 26, 28, etc., an extremely close packing of the overall semiconductor switch units can be achieved, which means that the required conductive pathways on the substrate are kept extremely short and that the inductances which are produced, especially at high voltages and short switching times, are very small. The layout of a module of this type can be easily adapted to suit various requirements. For example, let us assume that, in the example shown in FIG. 2 with eight so-called half-bridges, each of which is rated for 50 A, the module is intended for use with an electric machine in which a current in the range of 400 A is intended to flow in each phase. By making the substrate 40 either shorter or longer with a corresponding increase or decrease in the number of contact areas, on which half-bridges can be provided, it is possible in a simple manner to adapt the layout in a series of stages to the various currents required. The fabrication process also becomes comparatively simple, because it is not necessary to mount the semiconductor switch elements themselves such as IGBTs, for example, or MOSFETs on the substrate and to connect them electrically; instead, the switch housings, which are bought as standard components, can be simply be picked up by appropriate machines and placed on the substrate.

In summary, it can therefore be said concerning this embodiment of a power converter module that, in the case of the row 48 of semiconductor switch units 34, the gates, that is, the lugs 58, form the gate areas of the associated semiconductor switch units 34, whereas the contact areas 68 situated on the bottoms 66 of the switch housings 52 form the input terminals. The lugs 60 connected conductively to these contact areas 68 can in this case be nipped off or omitted entirely, because they are not contacted. These input terminals or contact areas 68 are then connected conductively to the input area 74 for the potential +V. In a corresponding manner, the emitter terminals or lugs 62 in the case of semiconductor switch units 32 of the row 46 form the input terminals and are connected conductively to the input area 102 of the potential −V. Here, too, the gate terminals, that is, the lugs 58, form the gate areas. The collector terminals, that is, the lugs 60, of the semiconductor switch units 32, which serve as at least part of the output terminals, are connected conductively over the shortest possible distance via the contact areas 82 to the emitter terminals, that is, to the lugs 62 of the semiconductor switch units 34. The contact areas 68 connected conductively to these lugs 60 on the back of the housing 50 establish the electrical connection to the output area 104.

With reference to FIGS. 3 and 4, it is described below how the two input areas 74, 102 and the output area 104 can be connected conductively to a voltage source. We can see here first that the conductor pins 88 of the output area 104 are connected conductively to a conductor rail 106, which extends at an angle of 90° C. to the plane of the drawing of FIG. 3 and is screwed to the conductor pins 88. This conductor rail 106 leads to the phase of the electric machine assigned to the power converter module shown in FIG. 3. Two conductor plates 108, 110, furthermore, which rest against each other across an intermediate layer of insulating material 112, lie above the power converter module 12. The conductor plate 108 forms the conductive connection between the conductor pins 72 of the input area 74 and the positive potential +V of a voltage source, such as a battery. In a corresponding manner, the conductor plate 110 forms the conductive connection between the conductor pins 100 of the input area 102 and the potential −V of the voltage source. Essentially the entire surfaces of the conductor plates 108, 110 lie over the substrate 40, and in the area in which one of the conductor plates 108, 110 is to be connected to an associated conductor pin 72 or 100, the other conductor plate in this particular case and the insulating material 112 have openings 114, 116, 118, 120. Threaded bolts 124 are then passed through the openings 116, 120 in the conductor plate 110 and in the insulating material 112 to fasten the conductor plate 108 rigidly to the conductor pins 72. The conductor pins 100 pass through the openings 114, 118 in the conductor plate 108 and in the insulating material 112, so that they, too, can be rigidly attached to the conductor plate 110 by threaded bolts 126.

Here, too, as a result of the closest possible positioning of the individual conductor plates 108, 110, the smallest possible inductance is achieved. This manner of producing contact, furthermore, also makes it possible to group several power converter modules together to form an overall converter 10, as can be seen in FIG. 4. Here we see the three adjacent modules 12, 14, 16, which are assigned to the three phases of an electric machine. Each of the converter modules 12, 14, 16 is constructed as described above with reference to FIGS. 2 and 3. The conductor plates 108, 110, to which the converter modules 12, 14, 16 are rigidly connected and which are connected conductively to the various potentials of the voltage source, lie above these converter modules 12, 14, 16. In this way, it possible to arrive at an extremely compact and sturdy converter 10, in which ultimately the individual converter modules 12, 14, 16 are also attached firmly to each other via the conductor plates 108, 110. It is also possible to see the three conductor rails 106 extending along the backs 86 of the semiconductor switch units 32, these rails leading to the phases of the motor to be excited.

An alternative embodiment of a power converter module according to the invention is shown in FIGS. 5 and 6, in which the same principles of arrangement described above are also used. Components which are the same with respect to design or function as those described above are designated by the same reference symbol with an added "a".

It can be seen that here, too, the individual semiconductor switch units 32a, 34a, of each of the various groups of switches 24a, 26a, etc., are offset with respect to each other in the direction of the rows 46a, 48a in such a way that the contact terminals or lugs 62a, 60a forming the output terminals or parts thereof are directly opposite each other essentially without any offset so that they both can make contact with the contact surfaces 82a. It can be seen that the contact surfaces 82a are designed as associated parts of the reference line 80a, which, of course, could also be the case with the embodiment according to FIGS. 1–3. The same is also true for the contact surfaces 96a, which are designed as associated parts of the reference line 94a.

Approximately in the middle between the two rows 46a, 48a, two conductor rails 130a, 132a extend. The conductor rail 130a, which therefore also extends in the same direction as the row 46a, has downward-projecting legs 134a in the areas over the contact surfaces 96a, which legs are connected conductively to the contact surfaces 96a and thus to the lugs 62a. In a corresponding manner, the conductor rail 132a also has downward-projecting legs 140a in the areas situated above the associated contact surfaces 138a, which legs are connected conductively with these contact surfaces 138a. In addition, the lugs 60a, that is, the collector terminals of the semiconductor switch units 34a, are connected conductively to these same contact surfaces 138a. The contact areas 68a of the switch housings 52a provided on the bottoms 66a of the housings 52a are held in place by soldering to the contact surfaces 70a of the substrate 40a, where in this case, however, a connection is provided only to establish mechanical attachment, not to establish an electrically conductive connection.

Between the two conductor rails 130a, 132a, i.e., between the associated legs 134a, 140a, there is again a layer of insulating material 142a, so that ultimately, by way of this intermediate material, 142a, the conductor rails 130a, 132a rest against each other and thus extend next to each other very closely. For the converter module 12a, the conductor rail 130a thus establishes the conductive connection of the input area 102a of the module to the negative potential −V, and the conductor rail 132a establishes the conductive connection of the input area 74a to the positive potential +V. In addition to the rail-like design of this conductor system producing the connections to the potentials, an essential difference with respect to the previous design is that the contact areas or lugs 60a serve as input terminals for the semiconductor switch units 34a.

In the output area 104a, the conductive connection to the associated phase of the electric machine to be driven is also established by a conductor bar or conductor rail 144a, which extends along the back 86a of the semiconductor switch units 32a, i.e., along their housings 50a. In the case of the embodiment according to FIGS. 5 and 6, it can also be seen that the individual gate lines 76a, 90a pass to some extent underneath the housings 50a, 52a, so that even greater practical advantage is taken of the available construction space. It is obvious that these gate lines 76a, 90a, each of which is connected via a resistor 78a, 92a to the lugs 58a of the semiconductor switch units 32a, 34a, are not connected to the contact areas 68a provided on the bottoms 64a, 66a of the housings 50a, 52a.

Another modified embodiment of a converter module according to the invention is shown in FIG. 7. Components which are the same as those described above with respect to design or function are designated by the same reference number with the addition of a "b".

FIG. 7 shows an arrangement in which the semiconductor switch units 32b, 34b of the individual groups of switches 24b, 26b, etc., are opposite or next to each other without offset in the direction of the rows 46b, 48b. In addition, the arrangement is such that the connecting sides 56b of the housings of the semiconductor switch units 34b face the backs 86b of the semiconductor switch units 32b. That is, the two semiconductor switch units 32b, 34b of the associated group of switches 24b, 26b, etc., are arranged on the substrate 40b so that they both point in the same orientation.

The contact surfaces 70b and the conductor pins 72b, are again assigned to the semiconductor switch units 34b of the row 48b. Contact surfaces 150b are now provided for the semiconductor switch units 32b of the row 46b. Again, two directly adjacent semiconductor switch units 32b, for example, can be attached to the contact surface 150b by soldering their contact areas 68b on the bottoms 64b of the units to the contact surface, these contact areas being indicated in FIG. 7. In addition, the contact terminals 62b, i.e., the emitter terminals, of the semiconductor switch units 34b are connected conductively to these contact surfaces 150b. The conductor pins 88b of the output area 104b are now situated between the two rows 46b, 48b and are in conductive contact with the contact surfaces 150b. The contact areas 68b provided on the bottom areas 64b of the individual switch housings 50b of the row 46b ultimately form the output terminals of these semiconductor switch units 32b. The input terminals of the semiconductor switch units 32b are formed by the lugs 62b, i.e., by the emitter terminals of same, which are connected conductively to the contact surface 152b on the substrate 40b. The conductor pins 100b of the input area 102b are connected conductively to these contact surfaces 152b.

Conductor plates, which are connected to the conductor pins 72b, 100b in the same was as described above, can again lie above the rows 46b, 48b, as shown in FIGS. 3 and 4. The conductor rails of the output area in this case extend along and between the rows 46b, 48b.

It can be seen in the embodiment according to FIG. 7 that, for both rows 46b, 48b of semiconductor switch units 32b, 34b, the collector terminals, i.e., the lugs 60b, which are in conductive contact with the contact areas on the bottom, are not used. They can therefore be removed or can be omitted from the very beginning.

It can also be seen in FIG. 7 that, as a result of the positioning of the semiconductor switch units 32b, 34b of the individual groups of switches 24b, 26b without any offset with respect to each other, an even closer packing of the semiconductor switch units is possible, so that the overall amount of occupied space, i.e., the surface area which must be made available on the substrate, can be reduced.

It should also be explained with respect to all of the embodiments of a converter module according to the invention described above that it is not necessary to install only a single one of these semiconductor switch elements i.e., an IGBT or a MOSFET, in the individual switch housings which hold the actual semiconductor switch elements; on the contrary, depending on the operational requirements, several of these semiconductor switch elements can be connected in parallel in the housing. In all of the design variants according to the invention, the close packing of the semiconductor switch elements and the short conducting pathways thus made possible are responsible for extremely small inductance values in the individual half-bridges. In addition, all of the embodiments offer the advantage that, as previously mentioned, the converter can be scaled up to any desired extent by adding more of these types of half bridges and thus adapted to the currents actually to be handled in practice. The rows of semiconductor switch units in question can easily be lengthened to any desired degree to develop modules of this type, which can be produced by making the substrate and the wiring traces provided thereon correspondingly longer or shorter. The electrical components serving to decouple the current such as the resistors mentioned can already be integrated into the modules, so that their modular character can be further reinforced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A power converter module for connecting one of a first input area at a first predetermined electric potential and a second input area at a second predetermined electric potential to an output area, said module comprising at least one group of switches, each said group of switches comprising
   a first semiconductor switch unit having a gate terminal, an input terminal connected to the first input area, an output terminal connected to the output area, and a housing having a connecting side on which said output terminal is provided, and
   a second semiconductor switch unit having a gate terminal, an input terminal connected to the second input area, an output terminal connected to the output area, and a housing having a connecting side on which said output terminal is provided, the connecting sides of said first and second switch units in each said group being arranged facing each other and offset so that respective said output terminals face each other without any offset.

2. A power converter as in claim 1 further comprising an insulated metal substrate, said at least one group of switches being mounted on said insulated metal substrate.

3. A power converter module according to claim 1 wherein each said switch unit comprises at least one of an IGBT semiconductor switch element and a MOSFET semiconductor switch element.

4. A power converter module as in claim 1 wherein each said switch unit comprises at least one semiconductor switch element embedded in said housing.

5. A power converter module as in claim 1 wherein each said first semiconductor switch unit is constructed identically to each said second semiconductor switch unit.

6. A power converter module as in claim 1 wherein said gate terminal of each of said semiconductor switch units is located on said connecting side, each of said semiconductor switch units comprising
   a first contact terminal having a first contact area on said connecting side, said first contact area of said first semiconductor switch unit serving as said output terminal, and
   a second contact terminal on the connecting side, said second contact terminal of said second switch unit serving as said output terminal and being positioned opposite and in electrical contact with said first contact area of said first switch unit.

7. A power converter module as in claim 6 wherein each said first contact terminal has a second contact area provided on said housing and conductively connected to said first contact area, said second contact area of said second switch unit serving as said input terminal and being conductively connected to said first input area, said second contact area of said first switch unit serving as said output terminal and being conductively connected to said output area.

8. A power converter module as in claim 6 wherein said first contact area of said second switch unit is conductively connected to said first input area.

9. A power converter module as in claim 8 wherein each said first contact terminal has a second contact area provided on said housing and conductively connected to said first contact area, said second contact area of each sa id first switch unit serving as said output terminal and being conductively connected to said output a area.

10. A power converter module as in claim 9 wherein said second contact terminal of said first switch unit is conductively connected to said second input area.

11. A power converter module as in claim 1 comprising a plurality of said groups of switches, each said first switch being arranged in a first row, each said second switch unit being arranged in a second row.

12. A power converter module as in claim 11 wherein each said gate terminal of each said first switch unit is connected by way of a resistor to a gate line of the first row, and each said gate terminal of each said second switch unit connected by way of a resistor to a gate line of the second row.

13. A power converter module as in claim 12 wherein each said input terminal of said first switch unit is connected to a conductor system of the first input area, each said input terminal of said second switch unit is connected to a conductor system of the second input area, and each said output terminal of the first and second switch units is connected to a conductor system of the output area.

14. A power converter module as in claim 13 wherein at least one of the conductor systems comprises a rail running along the rows of switch units.

15. A power converter module as in claim 13 wherein the conductor systems of the first and second input areas comprise parallel conductor plates which are arranged above the rows.

16. A power converter module as in claim 15 further comprising a layer of insulating material between said plates of said first and second input areas.

17. A power conversion device for a multiphase electric machine having phases, each phase having a power converter module comprising a first semiconductor switch unit having a gate terminal, an input terminal connected to the first input area, an output terminal connected to the output area, and a housing having a connecting side on which said output terminal is provided, and a second semiconductor switch unit having a gate terminal, an input terminal connected to the second input area, an output terminal connected to the output area, and a housing having a connecting side on which said output terminal is provided, the connecting sides of said first and second switch units in each said group being arranged facing each other and offset so that respective said output terminals face each other without any offset.

18. A power conversion device as in claim 17 wherein each power converter module comprises a plurality of said groups of switches, each said first switch unit being arranged in a first row, each said second switch unit being arranged in a second row, the first and second input areas comprise parallel conductor plates which are arranged above the rows, the input terminal of each said first switch unit is connected to the conductor plate of the first input area, and the input terminal of each said second switch unit is connected to the conductor plate of the second input area.

19. A power converter module for connecting one of a first input area at a first predetermined electric potential and a second input area at a second predetermined electric potential to an output area, said module comprising at least one group of switches, each said group of switches comprising a first semiconductor switch unit comprising a housing having a connecting side and an opposed rear side, a gate terminal on said connecting side, a first contact terminal having a first contact area, and a second contact terminal on said connecting side, said first and second contact terminals comprising an input terminal connected to said first input area and an output terminal connected to said output area, and a second semiconductor switch unit comprising a housing having a connecting side and an opposed rear side, a gate terminal on said connecting side, a first contact terminal having a first contact area, and a second contact terminal on said connecting side, said first and second contact terminals comprising an input terminal connected to said second input area and an output terminal connected to said output area, said connecting side of said housing of one of said first and second switch units facing said rear side of said housing of the other of said first and second switch units essentially without any offset.

20. A power converter module as in claim 19 wherein each said first contact terminal has a second contact area provided on said housing and conductively connected to said first contact area, said second contact area serving as said output terminal of said first switch unit, and the second terminal of the second switch unit is conductively connected to the second contact area of the first contact terminal of the first switch unit, said second contact terminal of said second switch unit serving as said output terminal.

21. A power converter module as in claim 20 wherein each said housing has a bottom, said second contact areas being provided on said bottoms.

22. A power converter module as in claim 19 wherein each said first semiconductor switch unit is constructed identically to each said second semiconductor switch unit.

* * * * *